(12) United States Patent
Mittelstadt

(10) Patent No.: US 6,564,063 B1
(45) Date of Patent: May 13, 2003

(54) MOBILE TELEPHONE POSITION SYSTEM

(75) Inventor: David J. Mittelstadt, Boulder, CO (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/392,488

(22) Filed: Sep. 9, 1999

(51) Int. Cl.[7] .......................... H04Q 7/20; H04M 15/00
(52) U.S. Cl. ........................ 455/456; 455/406
(58) Field of Search .................. 455/456, 457, 455/406, 407–408; 342/352, 357.01, 357.06; 701/200, 213, 300

(56) References Cited

U.S. PATENT DOCUMENTS

| | | | | |
|---|---|---|---|---|
| 4,901,307 A | * | 2/1990 | Gilhousen et al. | 370/18 |
| 5,542,100 A | * | 7/1996 | Hatakeyama | 455/456 |
| 5,737,700 A | | 4/1998 | Cox et al. | |
| 5,872,539 A | * | 2/1999 | Mullen | 342/357 |
| 5,963,866 A | * | 10/1999 | Palamara et al. | 455/456 |
| 6,049,711 A | * | 4/2000 | Ben-Yehezkel et al. | 455/414 |
| 6,088,594 A | * | 7/2000 | Kingdon et al. | 455/457 |
| 6,131,067 A | * | 10/2000 | Girerd et al. | 701/213 |
| 6,223,058 B1 | * | 4/2001 | Sudo et al. | 455/566 |

FOREIGN PATENT DOCUMENTS

| | | |
|---|---|---|
| WO | 9636193 | 11/1996 |
| WO | 9911078 | 3/1999 |

OTHER PUBLICATIONS

Nokia, Nokia 6160 Owner's Manual, Nokia Mobile Phones, Inc. (Canada).

* cited by examiner

Primary Examiner—Nguyen T. Vo
(74) Attorney, Agent, or Firm—Philip R. Wadsworth; Gregory D. Ogrod; Jae-Hee Choi

(57) ABSTRACT

A mobile telephone user places a call through the communication system to a position call system when they want their geographic position. The call could be initiated in several ways, such as dialing a number, pressing a programmed key, or selecting from a menu. In response to the call, the position call system obtains the geographic position of the mobile telephone from the communication system. The position call system transfers the geographic position to the mobile telephone over the call. The mobile telephone provides the geographic position to the user. The position call system also transfers billing information to the billing system over communication link.

23 Claims, 5 Drawing Sheets

FIG. 1 - PRIOR ART

MOBILE TELEPHONE POSITION SYSTEM

BACKGROUND OF THE INVENTION

I. Field of the Invention

The present invention relates to the field of mobile telephone systems. More particularly, the present invention relates to a novel and improved mobile telephone position system and mobile telephone that obtains its geographic position.

II. Description of the Related Art

FIG. 1 is a block diagram illustrating the use of the geographic position of a mobile telephone in the prior art. FIG. 1 depicts a Global Position Satellite (GPS) system 100, mobile telephone 101, communication system 102, and emergency call system 103. The communication system 102 includes a position calculation system 104. The configuration and operation of these devices and systems are well known.

The GPS system 100 broadcasts a GPS signal 110 that is received by the mobile telephone 101 and the communication system 102. The mobile telephone 101 processes the GPS signal 110 and transfers resulting GPS information to the communication system 102 in a control signal 111. The position calculation system 104 uses the GPS signal 110 and the GPS information from the control signal 111 to calculate the geographic position of the mobile telephone 101.

In an emergency, the user of the mobile telephone 101 places an emergency call 112 through the communication system 102 to the emergency call system 103. The emergency call 112 could be initiated in several ways, such as dialing 911, pressing a programmed key, or selecting from a menu. The user typically converses with an operator at the emergency call system 103 to relay important information related to the emergency. The position of the user is a critical piece of information because it is required for emergency personnel to locate and assist the user. If the user is unable to converse with the emergency system 103 on the emergency call 112, then the emergency call system 103 obtains the geographic position of the mobile telephone 101 from the position calculation system 104 using communication link 113. Emergency personnel use the geographic position of the mobile telephone 101 to locate and assist the user.

The use of the geographic position of the mobile telephone 101 in an emergency is of vital importance to the user. Unfortunately, the user is unable to effectively access this information in non-emergencies. In some situations, user access to the geographic position of the mobile telephone 101 could prevent an emergency from occurring. The ability for the user to obtain the geographic position of the mobile telephone 101 would enhance the value and utility of the services provided by the communication system 102.

Although mobile GPS devices are available that obtain and display position information, these devices are not integrated with a mobile telephone. Unfortunately, the user is required to purchase and carry additional equipment to obtain position information and to place calls. In addition, these GPS devices require additional circuitry to calculate their position using the GPS signal since they do not use the position calculation system 104 in the communication system 102. The additional circuitry is costly, consumes battery power, and may fail.

SUMMARY OF THE INVENTION

The present invention includes a novel and improved mobile telephone position system and mobile telephone. Advantageously, mobile telephone position system allows the user to obtain their geographic position. The system is operational in nonemergency situations. The system efficiently uses the position calculations of a communication system to avoid the additional circuitry and battery power required to perform such calculations within the mobile telephone.

The mobile telephone user places a call through the communication system to a position call system when they want their geographic position. The call could be initiated in several ways, such as dialing a number, pressing a programmed key, or selecting from a menu. In response to the call, the position call system obtains the geographic position of the mobile telephone from the communication system. The position call system transfers the geographic position to the mobile telephone over the call. The mobile telephone provides the geographic position to the user. The position call system also transfers billing information to a billing system.

In other embodiments the mobile telephone user enters a position request during an active call to any call device. In response to position request, the position call system obtains the geographic position of the mobile telephone from the communication system. The position call system transfers the geographic position to the mobile telephone over the call. The mobile telephone provides the geographic position to the user. The position call system also transfers billing information to a billing system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
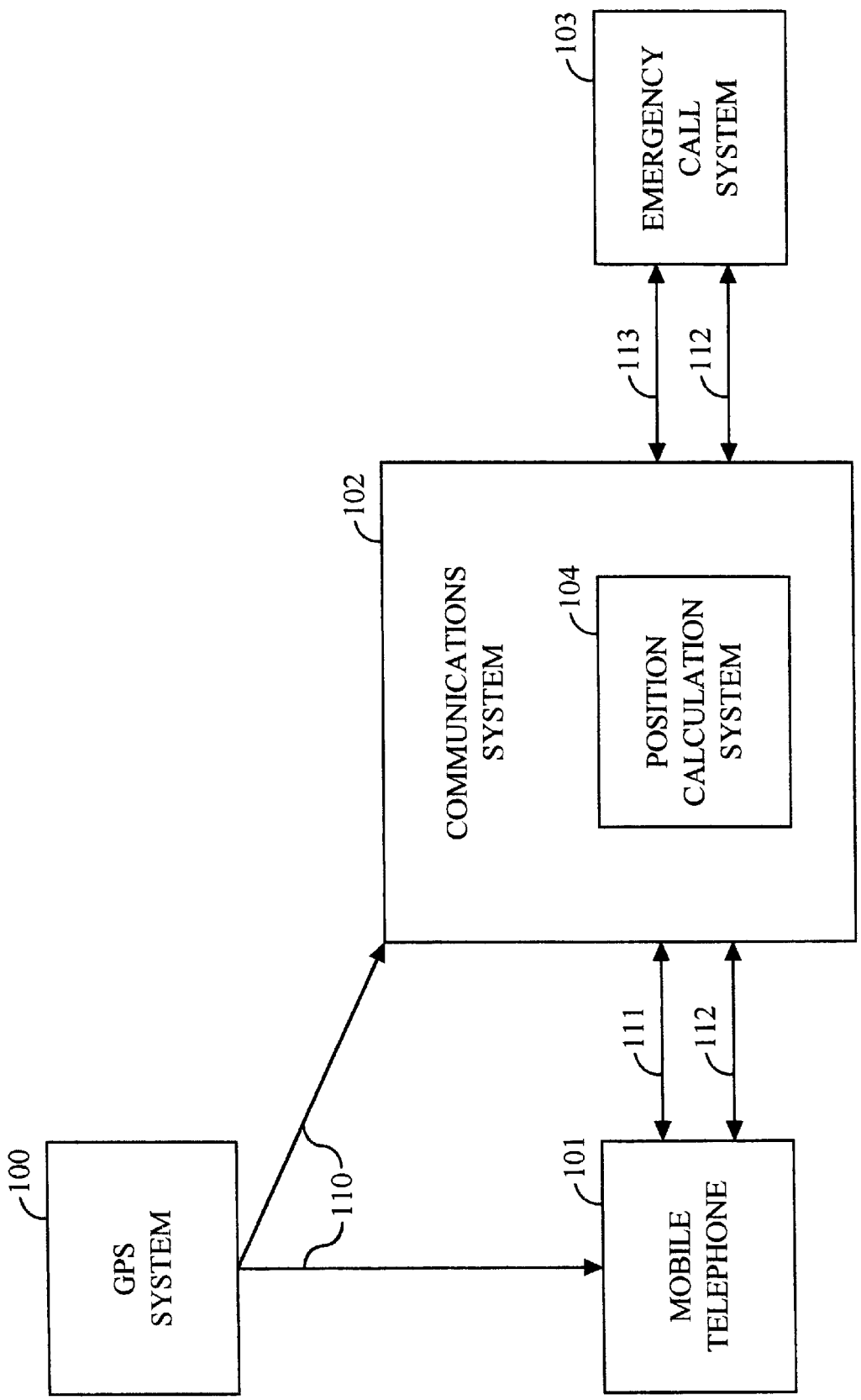
FIG. 1 is a block diagram illustrating the use of the geographic position of a mobile telephone in the prior art.
Figure 2:
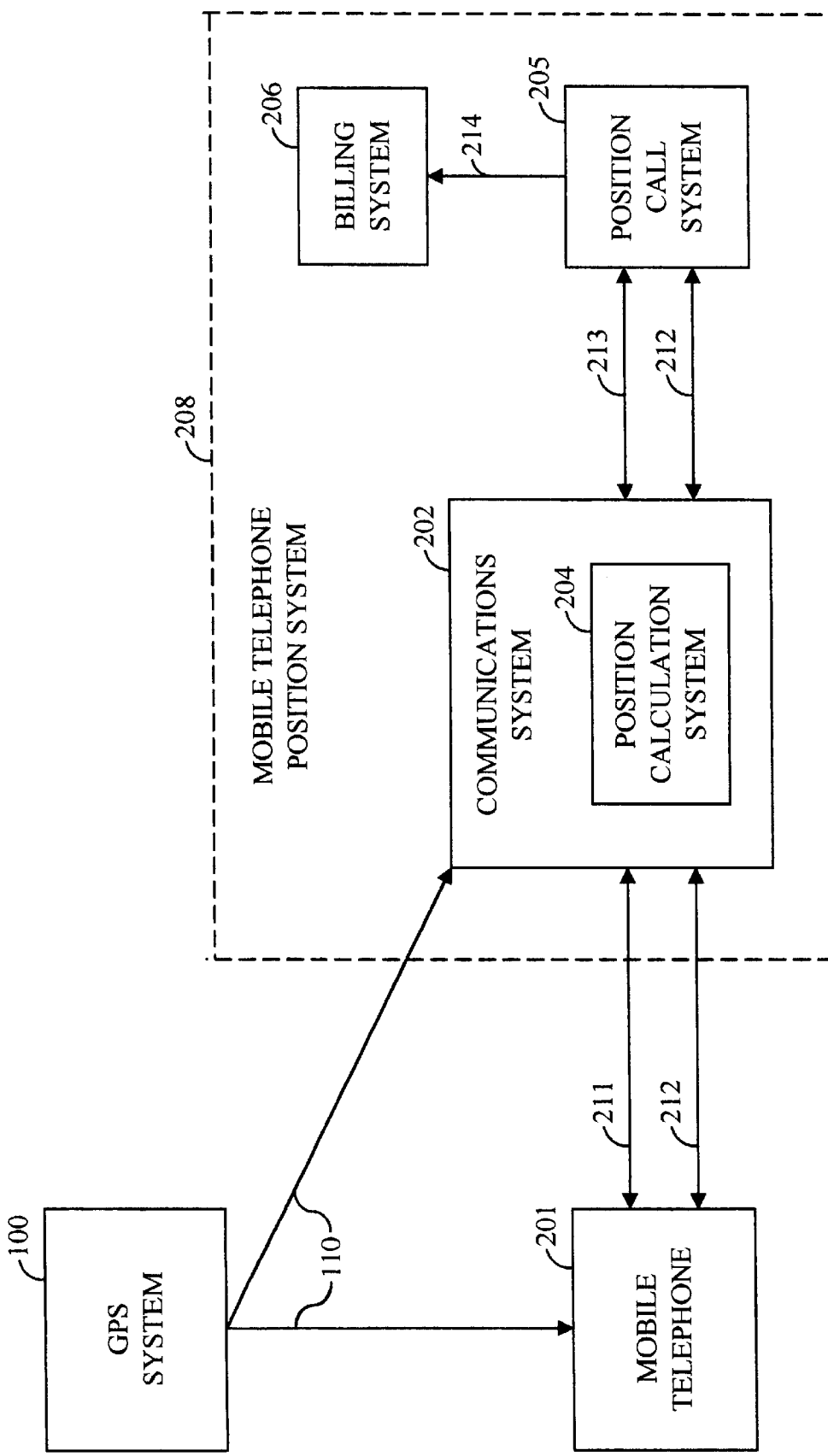
FIG. 2 is a block diagram of the devices and systems that provide a mobile telephone position service in an example of the invention.

FIG. 2 is a block diagram of the devices and systems that provide a mobile telephone position service in an example of the invention. FIG. 2 depicts the Global Position Satellite (GPS) system 100 from FIG. 1. FIG. 2 also depicts a mobile telephone 201 and a mobile telephone position system 208. The mobile telephone position system 208 includes communication system 202, position call system 205, and billing system 206. The communication system 202 includes a position calculation system 204.

The GPS system 100 broadcasts the GPS signal 110 that is received by the mobile telephone 201 and the communication system 202. The mobile telephone 201 processes the GPS signal 110 and transfers resulting GPS information to the communication system 202 in a control signal 211. The position calculation system 204 uses the GPS signal 110 and the GPS information from the control signal 211 to calculate the geographic position of the mobile telephone 201. Aside from the modifications required to provide the position service detailed below, the configuration and operation of these devices and systems are well known.

Figure 3:
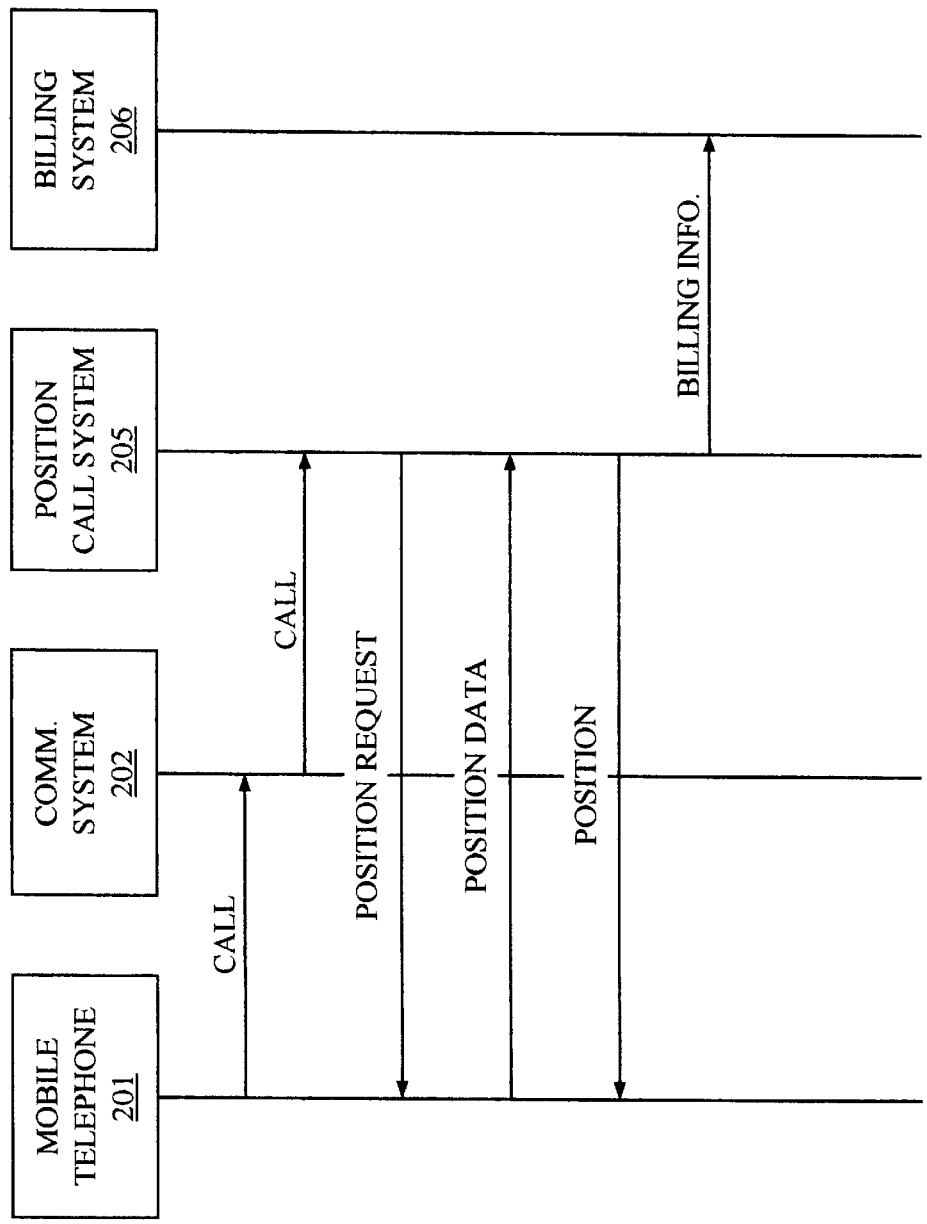
FIG. 3 is message sequence chart illustrating the operation of a mobile telephone position service in an example of the invention.

FIG. 3 is message sequence chart illustrating the operation of a mobile telephone position service in an example of the invention. Referring to FIGS. 2–3, the user of the mobile telephone 201 places a call 212 through the communication system 202 to the position call system 205 when they want their geographic position. The call 212 could be initiated in several ways, such as dialing a number, pressing a programmed key, or selecting from a menu. In response to the call 212, the position call system 205 sends a position request message to the mobile telephone 201. In response to the position request message mobile telephone 201 sends position data received from GPS system 100 to position call system 205. Position call system 205 obtains the geographic position from the position calculation system 204 using communication link 213. The position call system 205 transfers the geographic position of the mobile telephone 201 to the mobile telephone 201 over the call 212. Typically, the geographic position is given in longitude and latitude, but other forms are possible, with one example being altitude. The position call system 205 also transfers billing information to the billing system 206 over communication link 214. The billing information typically indicates the caller identity, the time of the call, the duration of the call, and the number of position requests made during the call.

Figure 4:
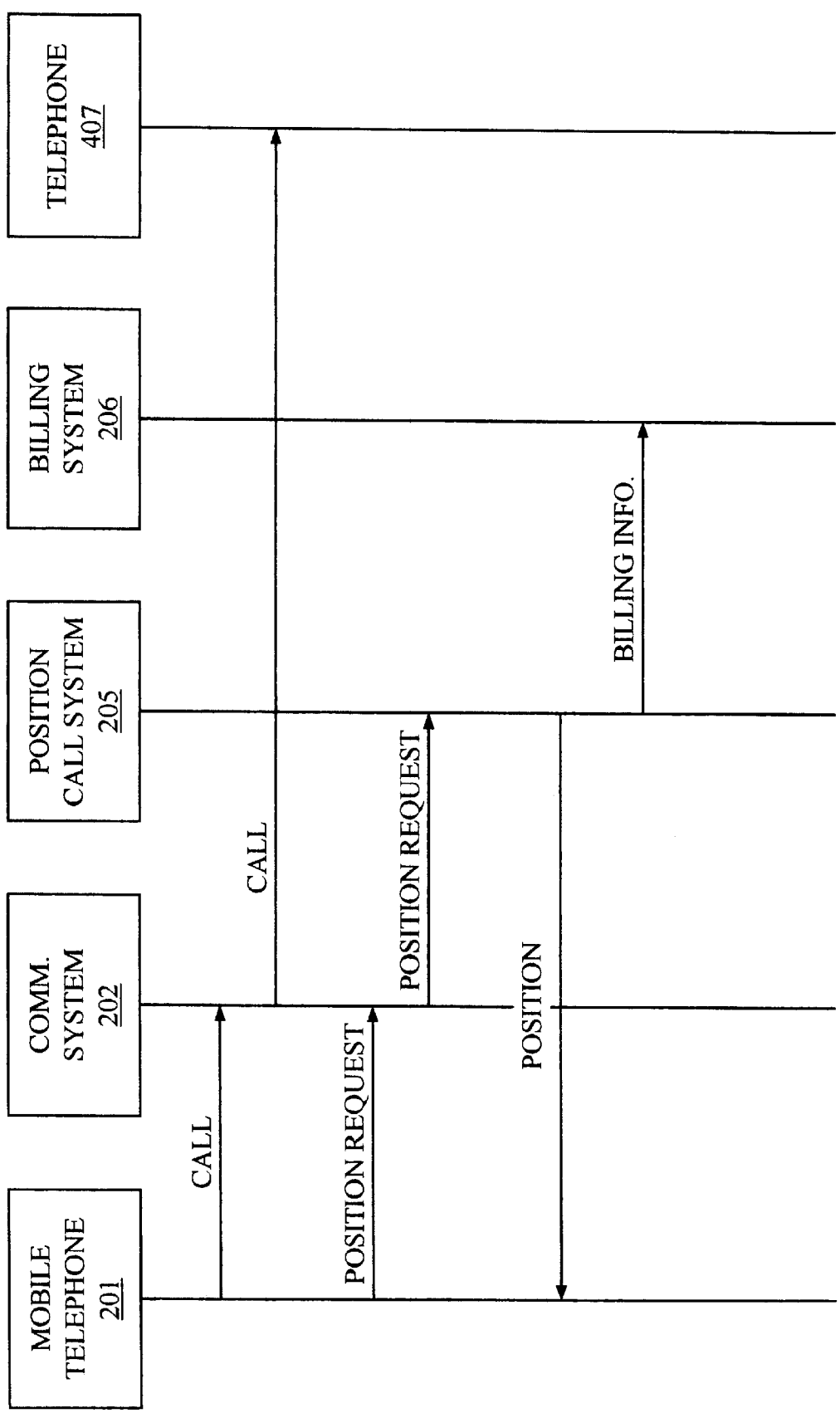
FIG. 4 is message sequence chart illustrating the operation of a mobile telephone position service in an example of the invention.

FIG. 4 is message sequence chart illustrating the operation of a mobile telephone position service in an example of the invention. Referring to FIGS. 2 and 4, the user of the mobile telephone 201 places a call 212 through the communication system 202. The call could be a call to telephone 407 as depicted on FIG. 4 or any other call device capable of receiving a call from mobile telephone 201. Alternatively, the call could be placed from telephone 407 to mobile telephone 201 or from any other call device capable of calling mobile telephone 201. During the call, the user enters a position request into mobile telephone 201 when they want their geographic position. Mobile telephone 201 receives position data from GPS system 100 and sends the position data to position call system 205 through communication system 202 in a position request message. Position call system 205 obtains the geographic position from the position calculation system 204 using communication link 213. The position call system 205 transfers the geographic position to the mobile telephone 201 over the call 212. Typically, the geographic position is given in longitude and latitude, but other forms are possible, with one example being altitude. The position call system 205 also transfers billing information to the billing system 206 over communication link 214. The billing information typically indicates the caller identity, the time of the call, the duration of the call, and the number of position requests made during the call.

The position call system 205 could be configured to handle the call 212 in various ways. A live operator could answer the call, receive the geographic position of the mobile telephone 201 on a display screen, and tell the user their geographic position. An automated voice system could be programmed to answer the call, convert the geographic position information into an audio message, and provide the audio message to the user. Instead of audio, a modem could be used to transfer the geographic position information to the mobile telephone 201 where it could be displayed to the user.

Figure 5:
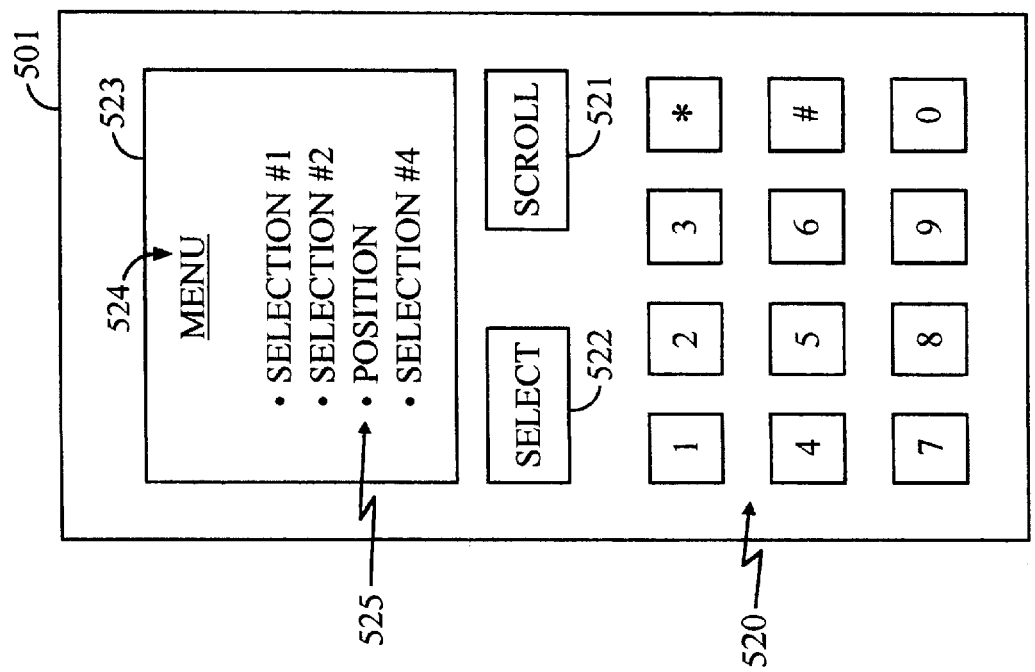
FIG. 5 is a depiction of a mobile telephone in an example of the invention.

FIG. 5 depicts a mobile telephone 501 in an example of the invention. The mobile telephone 501 includes dialing buttons 520, menu scroll control 521, menu select control 522, and display screen 523. The display screen 523 displays a menu 524 that includes a position selection 525. The user could use the dialing buttons 520 to initiate a call to obtain their position—either by dialing a complete telephone number or by using a button to dial a telephone number programmed into the mobile telephone 501. Alternatively, the user could use the menu scroll control 521 to get the menu 524 on the display screen 523, and then use the menu select control 522 to select the position selection 525. In response to the selection, the mobile telephone 501 would initiate the call using a programmed telephone number.

In other embodiments, the user could use the menu scroll control 521 during an active call to get the menu 524 on the display screen 523, and then use the menu select control 522 to select the position selection 525. In response to the selection, the mobile telephone 501 would perform the operation of FIG. 4 to display the position of the mobile telephone 501 on the display screen 523.

Figure 6:
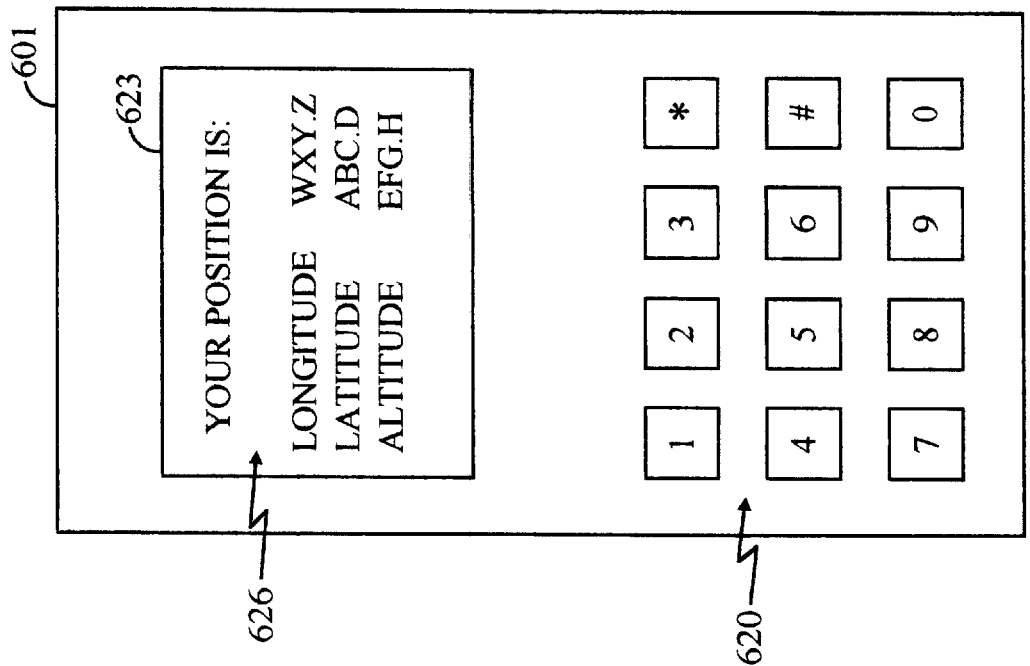
FIG. 6 is a depiction of a mobile telephone in an example of the invention.

FIG. 6 depicts a mobile telephone 601 in an example of the invention. The mobile telephone 601 includes dialing buttons 620 and display screen 623. After the geographic position has been received from the position call system, the display screen 623 displays the longitude, latitude, and altitude 626 of the mobile telephone 601. Typically, the mobile telephone 601 includes a modem to receive the longitude, latitude and altitude 626 from the position call system.

Variations in the above-described devices, systems, and service are within the scope of the invention. For example, the position call system 205 could be integrated within the communication system 202. Instead of the call 212, the control signal 211 could be used to exchange the position information. In addition, an auto-position feature could be added to the mobile telephone 201 to periodically obtain and display its geographic position using the techniques described above.

In some embodiments of the invention, the mobile telephone of the present invention is configured to communicate with satellites systems and in other embodiments the mobile telephone of the present invention is configured to communicate with terrestrial systems.

Some satellite systems use code division multiple access (CDMA) spread spectrum signals as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

Related commonly owned applications also incorporated herein by reference are application Ser. No. 08/723,722, entitled "Position Determination Using One Low-Earth Orbit Satellite," application Ser. No. 08/723,722, entitled "Passive Position Determination Using Two Low-Earth Orbit Satellite," application Ser. No. 08/723,725, entitled "Unambiguous Position Determination Using Two Low-Earth Orbit Satellites," and application Ser. No. 08/723,723 entitled "Ambiguity Resolution for Ambiguous Position Solutions Using Satellite Beams."

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for operating a mobile telephone position system, the method comprising:

receiving a call from a mobile telephone into a communications system and routing the call to a position call system, the mobile telephone configured to communicate with satellites;

in response to receiving the call, calculating a geographic position of the mobile telephone in the communication system, obtaining the geographic position of the mobile telephone from a geographic position satellite system in the communication system, the geographic position comprising longitude, latitude, and altitude;

transferring the geographic position of the mobile telephone from the position call system over the call; and transferring billing information from the position call system to a billing system, wherein the billing information indicates a caller identity, a time of the call, a duration of the call, and a number of position requests made during the call.

2. The method of claim 1 wherein receiving the call and transferring the geographic position over the call comprises using a live operator.

3. The method of claim 1 wherein receiving the call and transferring the geographic position over the call comprises using an automated voice system.

4. The method of claim 1 wherein transferring the geographic position over the call comprises using a modem.

5. The method of claim 1 wherein the mobile telephone is configured to communicate using code division multiple access spread spectrum signaling.

6. A mobile telephone position system comprising:

a communication system configured to receive a call from a mobile telephone and route the call and to calculate the geographic position of the mobile telephone;

a position call system configured to receive the call from the communications system, obtain a geographic position of the mobile telephone from a geographic position satellite system in the communication system, transfer the geographic position of the mobile telephone over the call, and transfer billing information regarding the call to a billing system;

wherein the geographic position comprises longitude, latitude, and altitude;

wherein the billing information indicates a caller identity, a time of the call, a duration of the call, and a number of position requests made during the call.

7. The mobile telephone position system of claim 6 wherein the position call system is configured to use a live operator.

8. The mobile telephone position system of claim 6 wherein the position call system comprises an automated voice system configured to answer the call and transfer the geographic position over the call.

9. The mobile telephone position system of claim 6 wherein the position call system comprises a modem configured to transfer the geographic position over the call.

10. The mobile telephone position system of claim 6 wherein the mobile telephone is configured to communicate with satellites.

11. The mobile telephone position system of claim 10 wherein the mobile telephone is configured to communicate using code division multiple access spread spectrum signaling.

12. A method for operating a mobile telephone, the method comprising:

placing a call to a position call system;

receiving a geographic position of the mobile telephone from a geographic position satellite system over the call;

displaying the geographic position of the mobile telephone, wherein the geographic information comprises longitude, latitude, and altitude; and transferring billing information from the position call system to a billing system, wherein the billing information indicates a caller identity, a time of the call, a duration of the call, and a number of position requests made during the call.

13. The method of claim 12 wherein placing the call comprises placing the call to a position call system.

14. The method of claim 12 wherein placing the call comprises displaying a menu and receiving a menu selection.

15. The method of claim 12 wherein placing the call comprises using a telephone number programmed into the mobile telephone.

16. The method of claim 12 wherein receiving the geographic position comprises using a modem.

17. The method of claim 12 wherein the mobile telephone is configured to communicate with satellites.

18. The method of claim 17 wherein the mobile telephone is configured to communicate using code division multiple access spread spectrum signaling.

19. A mobile telephone comprising:

means for placing a call to a position call system comprising a geographic position satellite system;

means for receiving a geographic position of the mobile telephone from the geographic position satellite system over the call;

means for transferring billing information from the position call system to a billing system, wherein the billing information indicates a caller identity, a time of the call, a duration of the call, and a number of position requests made during the call; and a display configured to display the geographic position of the mobile telephone.

20. The mobile telephone of claim 19 wherein the display is configured to display longitude, latitude, and altitude.

21. The mobile telephone of claim 19 wherein the means for receiving the geographic position comprises a modem.

22. The mobile telephone of claim 19 wherein the mobile telephone is configured to communicate with satellites.

23. The mobile telephone of claim 22 wherein the mobile telephone is configured to communicate using code division multiple access spread spectrum signaling.

* * * * *